United States Patent
Koegel

(10) Patent No.: US 8,915,170 B2
(45) Date of Patent: Dec. 23, 2014

(54) OPTICAL ALIGNMENT DEVICE FOR A TABLE SAW

(71) Applicants: Robert Bosch Tool Corporation, Broadview, IL (US); Robert Bosch GmbH, Stuttgart (DE)

(72) Inventor: Jan Koegel, Oak Park, IL (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/143,673

(22) Filed: Dec. 30, 2013

(65) Prior Publication Data

US 2014/0109744 A1    Apr. 24, 2014

Related U.S. Application Data

(63) Continuation of application No. 13/081,791, filed on Apr. 7, 2011, now Pat. No. 8,616,102.

(51) Int. Cl.
   *B23D 45/00* (2006.01)

(52) U.S. Cl.
   USPC .............................. 83/102.1; 83/477; 83/701

(58) Field of Classification Search
   USPC ............... 83/102, 102.1, 477, 477.2, 522.22, 83/522.15, 701, 477.1, 105
   See application file for complete search history.

(56) References Cited

U.S. PATENT DOCUMENTS

| | | | |
|---|---|---|---|
| 4,469,931 A * | 9/1984 | Macken | 219/121.67 |
| 4,885,967 A * | 12/1989 | Bell et al. | 83/520 |
| 5,116,344 A | 5/1992 | Sundqvist | |
| 5,121,188 A * | 6/1992 | Patridge et al. | 257/680 |
| 5,132,509 A | 7/1992 | Hayakawa | |
| 5,191,935 A | 3/1993 | Mccombie | |
| 5,285,708 A | 2/1994 | Bosten et al. | |
| 5,301,726 A | 4/1994 | Wojcik | |
| 5,379,815 A | 1/1995 | Brazell et al. | |
| 5,387,969 A | 2/1995 | Marantette | |
| 5,446,635 A | 8/1995 | Jehn | |
| 5,797,670 A | 8/1998 | Snoke et al. | |
| 5,862,727 A | 1/1999 | Kelly | |
| 5,996,460 A | 12/1999 | Waite | |
| 6,253,757 B1 | 7/2001 | Benson | |
| 6,493,955 B1 | 12/2002 | Moretti | |
| 6,498,653 B1 | 12/2002 | Wang | |
| 6,565,227 B1 | 5/2003 | Davis | |
| 6,937,336 B2 | 8/2005 | Garcia et al. | |

(Continued)

FOREIGN PATENT DOCUMENTS

| | | |
|---|---|---|
| CN | 2656100 A1 | 11/2004 |
| DE | 3406904 A2 | 9/1984 |

(Continued)

OTHER PUBLICATIONS

International Search Report and Written Opinion in corresponding PCT application (i.e., PCT/US2012/032256), mailed Jul. 12, 2012 (10 pages).

*Primary Examiner* — Sean Michalski
(74) *Attorney, Agent, or Firm* — Maginot Moore & Beck LLP

(57) ABSTRACT

A table saw includes a workpiece support surface and a laser apparatus. The workpiece support surface defines a blade opening through which a cutting blade is configured to extend. The laser apparatus is configured to emit a laser light away from the workpiece support surface.

18 Claims, 4 Drawing Sheets

(56) References Cited

U.S. PATENT DOCUMENTS

| | | |
|---|---|---|
| 6,976,764 B2 | 12/2005 | Cheng et al. |
| 7,073,268 B1 | 7/2006 | Etter et al. |
| 7,137,327 B2 | 11/2006 | Garcia et al. |
| 7,205,502 B2 | 4/2007 | Yamazaki et al. |
| 7,226,179 B2 | 6/2007 | Garcia et al. |
| 7,284,335 B2 | 10/2007 | Park et al. |
| 7,347,133 B2 | 3/2008 | Cheng et al. |
| 7,458,696 B2 | 12/2008 | Chen |
| 8,091,456 B2 | 1/2012 | Keller et al. |
| 8,424,434 B2 | 4/2013 | Koegel et al. |
| 2002/0054491 A1 | 5/2002 | Casas |
| 2002/0059871 A1 | 5/2002 | Chen |
| 2002/0131267 A1 | 9/2002 | Van Osenbruggen |
| 2002/0170404 A1 | 11/2002 | Peot et al. |
| 2003/0010173 A1 | 1/2003 | Hayden |
| 2003/0209678 A1 | 11/2003 | Pease |
| 2003/0233921 A1 | 12/2003 | Garcia et al. |
| 2004/0032587 A1 | 2/2004 | Garcia et al. |
| 2004/0083869 A1 | 5/2004 | Aziz et al. |
| 2004/0254673 A1 | 12/2004 | Tomelleri |
| 2004/0261592 A1 | 12/2004 | Chen |
| 2005/0024649 A1 | 2/2005 | Tsai |
| 2005/0094386 A1 | 5/2005 | Zhang et al. |
| 2005/0098012 A1 | 5/2005 | Cheng et al. |
| 2005/0263504 A1 | 12/2005 | Yamazaki et al. |
| 2006/0101969 A1 | 5/2006 | Garcia et al. |
| 2007/0151432 A1 | 7/2007 | Garcia et al. |
| 2008/0092709 A1 | 4/2008 | Gaw |
| 2008/0121081 A1 | 5/2008 | Cheng et al. |
| 2008/0121082 A1 | 5/2008 | Smith et al. |
| 2008/0137339 A1 | 6/2008 | Nash et al. |
| 2008/0184861 A1 | 8/2008 | Takase |
| 2009/0133871 A1 | 5/2009 | Skinner et al. |
| 2011/0271810 A1 | 11/2011 | Brown et al. |
| 2013/0008656 A1 | 1/2013 | Schultz et al. |

FOREIGN PATENT DOCUMENTS

| | | |
|---|---|---|
| DE | 10215871 | 10/2003 |
| EP | 2223773 A1 | 9/2010 |
| GB | 2414212 | 11/2005 |
| WO | 2005102626 A2 | 11/2005 |

\* cited by examiner

US 8,915,170 B2

OPTICAL ALIGNMENT DEVICE FOR A TABLE SAW

This application is a continuation application of application Ser. No. 13/081,791, filed on Apr. 7, 2011 (now U.S. Pat. No. 8,616,102), the disclosure of such application which is totally incorporated by reference herein in its entirety.

FIELD

The present disclosure relates generally to power tools and particularly to alignment devices for power tools.

BACKGROUND

Numerous power tools have been developed to facilitate forming a workpiece into a desired shape. One such power tool for forming a workpiece is a table saw. Table saws are typically used to cross-cut and rip-cut workpieces, such as hardwood, wood products, construction lumber, and other materials.

Most table saws include a workpiece support surface and a cutting blade. The workpiece support surface is a generally planar surface on which a user positions the workpiece for cutting. The cutting blade, typically a circular saw blade, is mounted for rotation to an electric motor. The electric motor is positioned below the support surface. An upper portion of the blade extends above the support surface through a blade opening in the support surface. The narrow edge of the blade defines a cutting path.

An alignment device is included with most table saws to assist users in positioning the workpiece relative to the cutting path of the blade. One type of alignment device is an indicium on the support surface that identifies the cutting path of the blade. A user cuts the workpiece along a desired cut line by aligning the cut line with the indicium and then directing the workpiece past the rotating blade. Another type of alignment device is a laser positioning device, which projects a laser line onto the support surface. The laser line is aligned with the cutting path of the blade. To cut the workpiece along the cut line, a user aligns the cut line with the laser line and then directs the workpiece past the rotating blade.

There exists a continuing need in the art to increase the accuracy and precision of table saw alignment devices without increasing the cost and the complexity of the devices.

SUMMARY

In accordance with one embodiment of the disclosure, there is provided a table saw including a workpiece support surface and a laser apparatus. The workpiece support surface defines a blade opening through which a cutting blade is configured to extend. The laser apparatus is configured to emit a laser light away from the workpiece support surface.

Pursuant to another embodiment of the disclosure, there is provided a table saw including a workpiece support surface, a light apparatus, and a reflective surface. The workpiece support surface defines a blade opening through which a cutting blade is configured to extend. The light apparatus is configured to emit a beam of light. The reflective surface is operably positioned to reflect the beam of light onto the workpiece support surface.

In accordance with yet another embodiment of the present disclosure, there is provided an optical alignment device for a table saw including a laser apparatus and a reflective surface. The laser apparatus is configured for connection to the table saw and is configured to emit a laser light away from a workpiece support surface of the table saw. The reflective surface is configured for connection to the table saw and is operably positioned to reflect the laser light toward the workpiece support surface.

BRIEF DESCRIPTION OF THE FIGURES

The above-described features and advantages, as well as others, should become more readily apparent to those of ordinary skill in the art by reference to the following detailed description and the accompanying figures in which.

DETAILED DESCRIPTION

Figure 1:
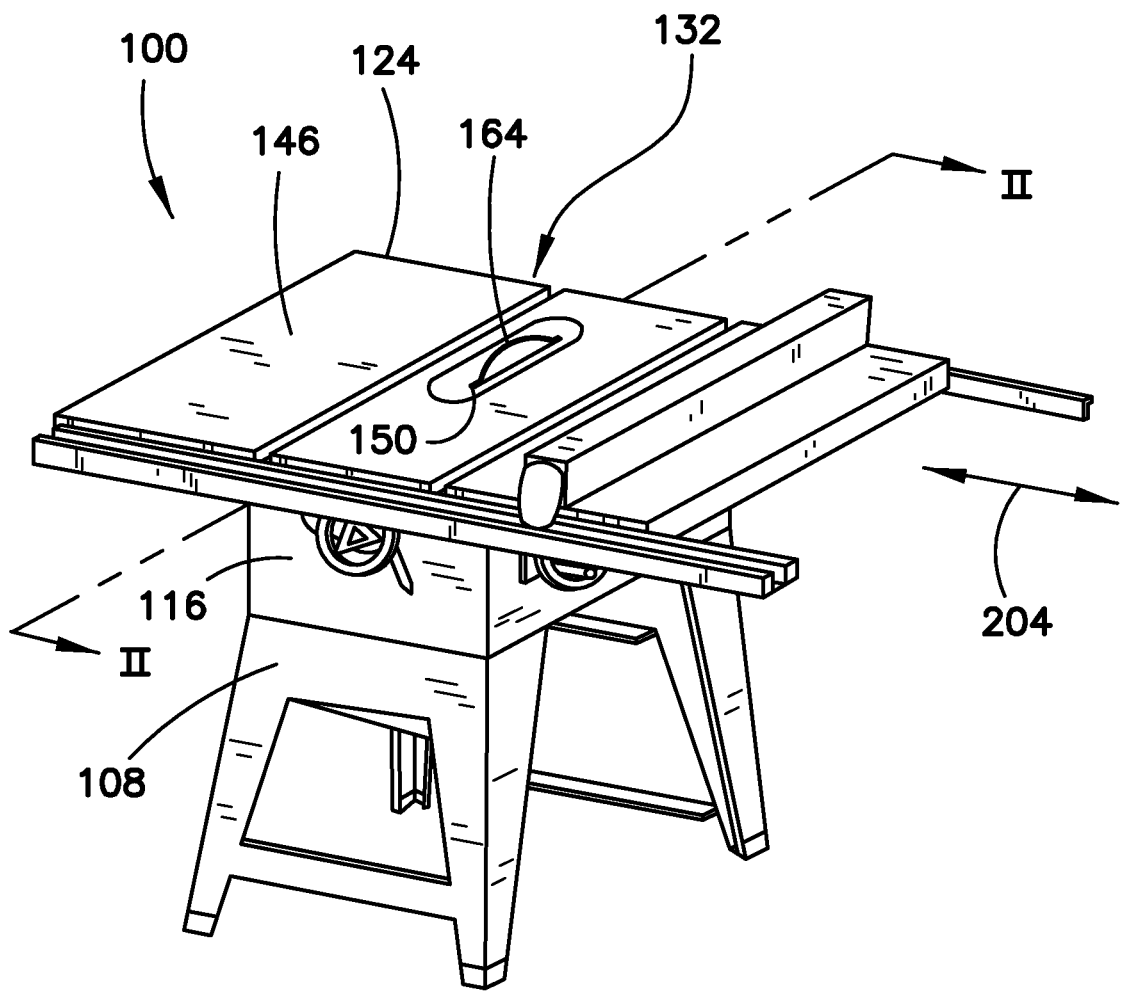
FIG. 1 shows a perspective view of a table saw.

FIG. 1 shows a table saw 100 configured to shape a workpiece. Exemplary workpieces that may be shaped with the table saw 100 include construction lumber, hardwoods, building materials, and the like. The table saw 100 include a base 108, an enclosure 116, a table top 124, a cutting assembly 132, and an optical alignment device (shown in FIG. 2). The base 108 is connected to the bottom side of the enclosure 116 and is configured to support the enclosure, the table top 124, the cutting assembly 132, and the optical alignment device. The base 108 is constructed of metal, rigid plastic, or the like. The base 108 includes four ground-engaging legs; however, other configurations of the base are possible.

The enclosure 116 defines an internal space, which houses various components of the table saw 100 including a portion of the cutting assembly 132 and a portion of the optical alignment device. The enclosure 116 is constructed of metal, rigid plastic, or the like, and is configured to support the table top 124.

The table top 124 is connected to the top side of the enclosure 116. The table top 124 is usually constructed of a rigid and generally flat material such as metal, plastic, and/or fiberglass; however, the table top may also be constructed from other suitable materials. The upper surface of the table top 124 defines a workpiece support surface 146, which supports a workpiece to be cut or shaped by the cutting assembly 132. The support surface 146 defines a blade opening 150 through which a portion of the cutting assembly 132 (i.e. the cutting blade 164) is configured to extend.

Figure 2:
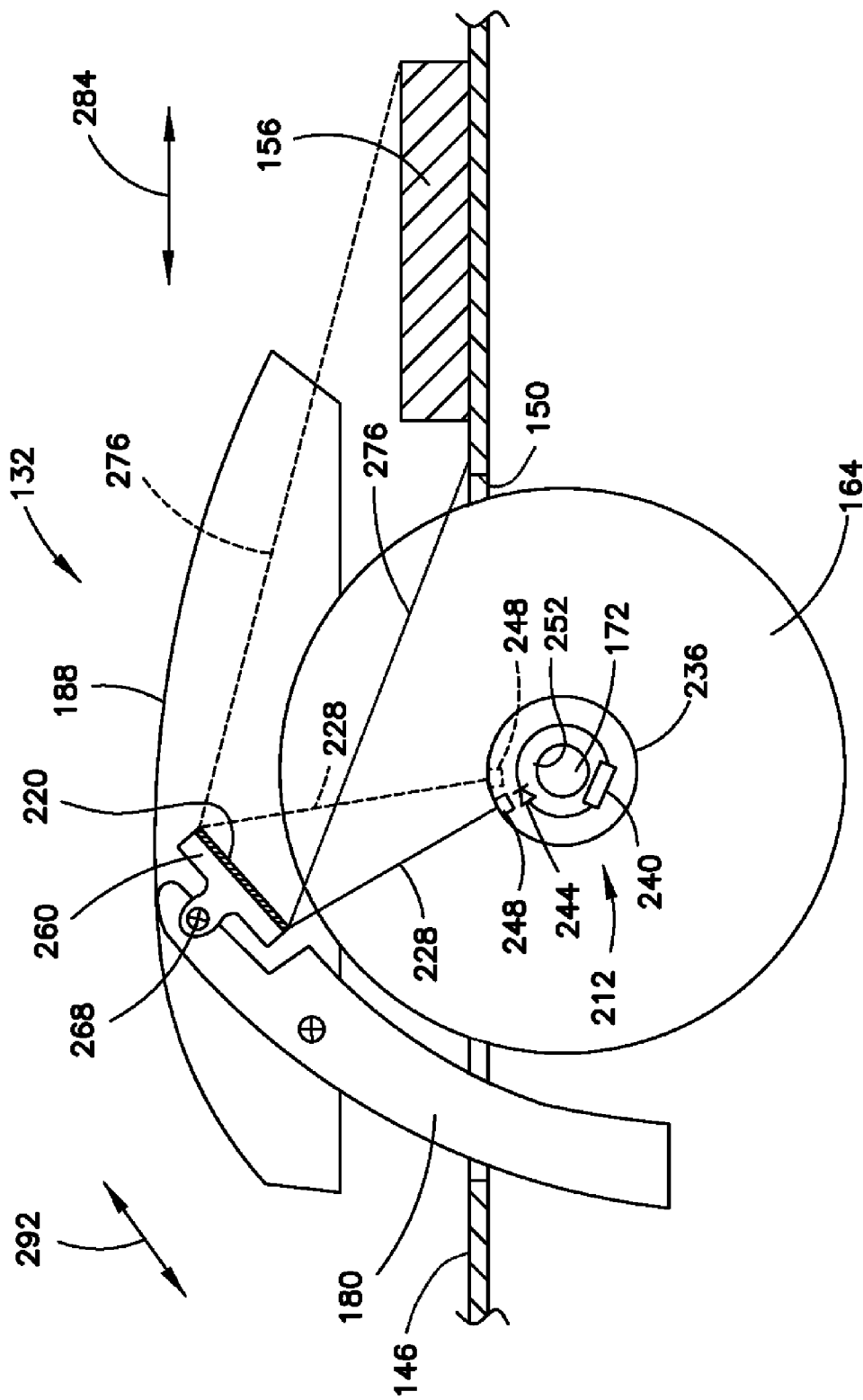
FIG. 2 shows a cross sectional view of the table saw of FIG. 1 along the line II-II, with a light emitting apparatus associated with the table saw.

As shown in FIG. 2, the cutting assembly 132 is configured to cut a workpiece 156 positioned on the workpiece support surface 146. The cutting assembly 132 includes a cutting blade 164, an electric motor (not shown) including a motor shaft 172, a riving knife 180, and a blade guard 188. In the embodiment of FIG. 2, the blade 164 is a circular saw blade with cutting teeth or other cutting members. The particular type of blade 164 is typically determined by the composition of the workpiece 156 and the manner in which the workpiece is cut (i.e. rip-cut or cross-cut). The blade 164 defines a shaft opening through which the motor shaft 172 is configured to extend. The electric motor rotates the motor shaft 172 and the blade 164 about an axis of rotation 204 (FIG. 1). The blade 164 is rotated in a clockwise direction, as illustrated in FIG. 2. The electric motor and the blade 164 are positionable relative to the support surface 146 to enable the cutting assembly 132 to make beveled cuts and cuts of a particular depth. The blade 164 is shown in FIG. 2 near a position of maximum cutting depth.

The riving knife 180 is positioned at the rear side of the blade 164 and is configured to prevent a kerf in the workpiece 156 from closing behind the blade. The riving knife 180 is typically constructed of metal. A lower portion of the riving knife 180 is positioned below the support surface 146 and is coupled to the motor and the motor shaft 172. Therefore, the riving knife 180 moves with the electric motor and the blade 164 when the position of the blade is adjusted. Accordingly, the riving knife 180 does not interfere with cutting the workpiece 156 when the height and/or bevel angle of the blade 164 are adjusted by the user. In some embodiments, the riving knife 180 is referred to as a blade guard support.

The blade guard 188 is configured to prevent objects from inadvertently contacting the blade 164. The blade guard 188 is movably connected to the upper portion of the riving knife 180 and defines an internal space in which the portion of the blade 164 above the support surface 146 is positioned. The blade guard 188 is movable in any direction relative to the support surface 146. Specifically, the blade guard 188 may be moved in a horizontal and/or a vertical direction relative to the support surface 146. The blade guard 188 may also be pivoted relative to the riving knife 180. Furthermore, the blade guard 188 may be moved relative to the support surface 146 in a direction parallel to the axis of rotation 204 of the blade 164. The blade guard 188 is typically formed from rigid plastic; however, the blade guard may also be formed from metal such as aluminum and/or other materials.

With continued reference to FIG. 2, the optical alignment device is configured to strike a beam of light (or any other pattern of light) onto the support surface 146. The optical alignment device includes a light apparatus 212 and a reflective surface 220. The light apparatus 212 is positioned below the support surface 146 and is mounted on the motor shaft 172. The reflective surface 220 is positioned above the support surface 146 and is mounted to the riving knife 180.

The light apparatus 212 emits the beam of light through the blade opening 150 in the support surface 146. In the embodiment of FIG. 2, the light apparatus 212 is a laser apparatus, and the beam of light is laser light 228. In other embodiments, however, the light apparatus 212 emits non-laser light, as may be emitted by a light emitting diode ("LED"), a fluorescent light source, or an incandescent light source. The laser light 228 (or non-laser light) is emitted by the light apparatus 212 in a direction extending away from the support surface 146. In other words, the laser light 228 (or non-laser light) is emitted from the light apparatus 212 in such a manner that, if not redirected, the light would not strike the support surface 146. The reflective surface 220 intercepts the laser light 228, such that reflected laser light 276 is directed toward the support surface 146.

The light apparatus 212, in the embodiment of FIG. 2, includes a case 236, a power source 240, a laser diode 244, and a lens 248. The case 236 is formed from metal, plastic, and/or other suitable materials. The case 236 has a generally toroid shape, which defines a shaft opening referred to as a central opening 252. The motor shaft 172 extends through the central opening 252. The diameter of the central opening 252 is approximately equal to the shaft opening of the blade 164. A bolt (not shown), or other fastening member, is threaded into the end of the motor shaft 172 to connect the case 236 and the blade 164 to the motor shaft. Accordingly, the light apparatus 212 and the blade 164 rotate with the motor shaft 172 about the axis of rotation 204. The case 236 may be positioned on the front side of the blade 164, as shown in FIG. 2, or the rear side of the blade (not shown).

The case 236 is configured to withstand the forces imparted on the light apparatus 212 due to the rotation of the motor shaft 172. These forces include at least a centripetal force directed toward the axis of rotation and a reactive centrifugal force in response to the centripetal force. The case 236 maintains the relative positions of the power source 240, the laser diode 244, and the lens 248 even when the motor shaft 172 is rotating.

The power source 240 is connected to the laser diode 244 and is configured to supply the laser diode with electrical energy. The power source 240 may be a battery. In other embodiments, the laser diode 244 may receive electrical power from the power source that supplies the electric motor with electrical power.

The laser diode 244 emits laser light 228 in response to being electrically connected to the power source 240. The laser diode 244 may be selected based on a desired wavelength of the laser light 228. Exemplary laser diodes 244 may emit a laser light 228 that has a red color, a green color, or any other color that is suitable for viewing by a user.

The lens 248 receives and focuses the laser light 236 from the laser diode 244 and emits the laser light radially with respect to the axis of rotation 204. As shown in FIG. 2, the lens 248 focuses the beam of light in a single line of light parallel to the cutting direction of the blade 164. In other embodiments, however, the lens 248 focuses the beam of light into a point of light on the workpiece 156 and/or the support surface 146. Similarly, lens 248 may focus the beam of light into a pattern, which forms a pair of parallel lines on the workpiece 156 and/or the support surface 146. The parallel lines may be positioned to identify the cutting width of the blade 164. Still further, the lens 248 may be configured to focus the beam of light into a grid pattern on the workpiece 156 and/or the support surface 146. The grid pattern includes a first set of parallel lines and a second set of parallel lines, which are orthogonal to the first set of parallel lines. The lens 248 may be formed from translucent materials including glass and certain plastics. The lens 248 may be interchangeable with other lens to enable selection of the pattern of the beam of light. The lens 248 is configured to focus laser light as well as non-laser light.

The lens 248 is illustrated in FIG. 2 at two rotational positions of the light apparatus 212 as the light apparatus rotates with the motor shaft 172. The laser light 228 emitted by the lens 248 when the lens is in the first position, is shown with a solid line, and strikes a bottom edge of the reflective surface 220. As the light apparatus 212 rotates about the rotational axis 204 in the clockwise direction, the laser light 228 continues to strike the reflective surface 220 until just after the light apparatus is in the second position. In the second position the laser light 228 is shown with a broken line, and strikes an upper edge of the reflective surface 220. The lens 248 in the second position is shown with broken lines in FIG. 2. As the light apparatus 212 rotates past the second position, the laser light 228 is emitted within the enclosure 116 until the lens 248 is in the first position again. In another embodiment, however, as the light apparatus 212 rotates past the second position, the light apparatus stops emitting the laser light 228 until the lens 248 is in the first position again.

With continued reference to FIG. 2, the reflective surface 220 reflects the laser light 228 toward the support surface 146. The reflective surface 220 may be a glass mirror, a polished metal mirror, any other type of mirror, or any other reflective surface. In one embodiment, the reflective surface 220 is a piece of adhesive tape having a reflective portion. Typically, the reflective surface 220 reflects the laser light 228 (or non-laser light) onto the support surface 146 in a position based on the cutting path of the blade 164; however, other configurations are possible. In some embodiments, the reflective surface 220 has a curved shaped in order to focus the light from the light apparatus 212 into a line of light. An exemplary curved shape is a parabolic shape.

In FIG. 2, the reflective surface 220 is an element of a reflector apparatus 260 that is connected to the upper portion of the riving knife 180 at a connection point 268. The reflector apparatus 260 is movable in any direction relative to the support surface 146 to enable positioning of the reflective surface 220 and the reflected laser light 276. Specifically, the reflector apparatus 260 is movable about a pivot axis that is parallel the axis of rotation 204 and perpendicular to the direction of the laser light 228. Accordingly, the position of the reflected laser light 276 may be adjusted in the direction 284 by pivoting the reflector apparatus 260. The reflector apparatus 260 also enables movement of the reflective surface 220 about a pivot axis 292, such that the reflected laser light 276 may be positioned in alignment with, closer to, or further from the cutting path of the blade 164.

The rotation of the light apparatus 212 by the electric motor causes the reflected laser light 276 to strike the reflective surface 220 for a brief time for each rotation of the motor shaft 172. However, the high rotational speed of the motor shaft 172 makes the reflected laser light 276 appear to a user of the table saw 100 as a continuous line of laser light. Accordingly, even though the laser light 228 is emitted from the light apparatus 212 as a point of laser light, the light apparatus appears to impart a line of laser light onto the support surface 146 and the workpiece 156. Additionally, the reflected line of laser light appears to a user to have a relatively constant intensity even though the laser light 228 is intermittently reflected onto the support surface 146 and the workpiece 156.

Figure 3:
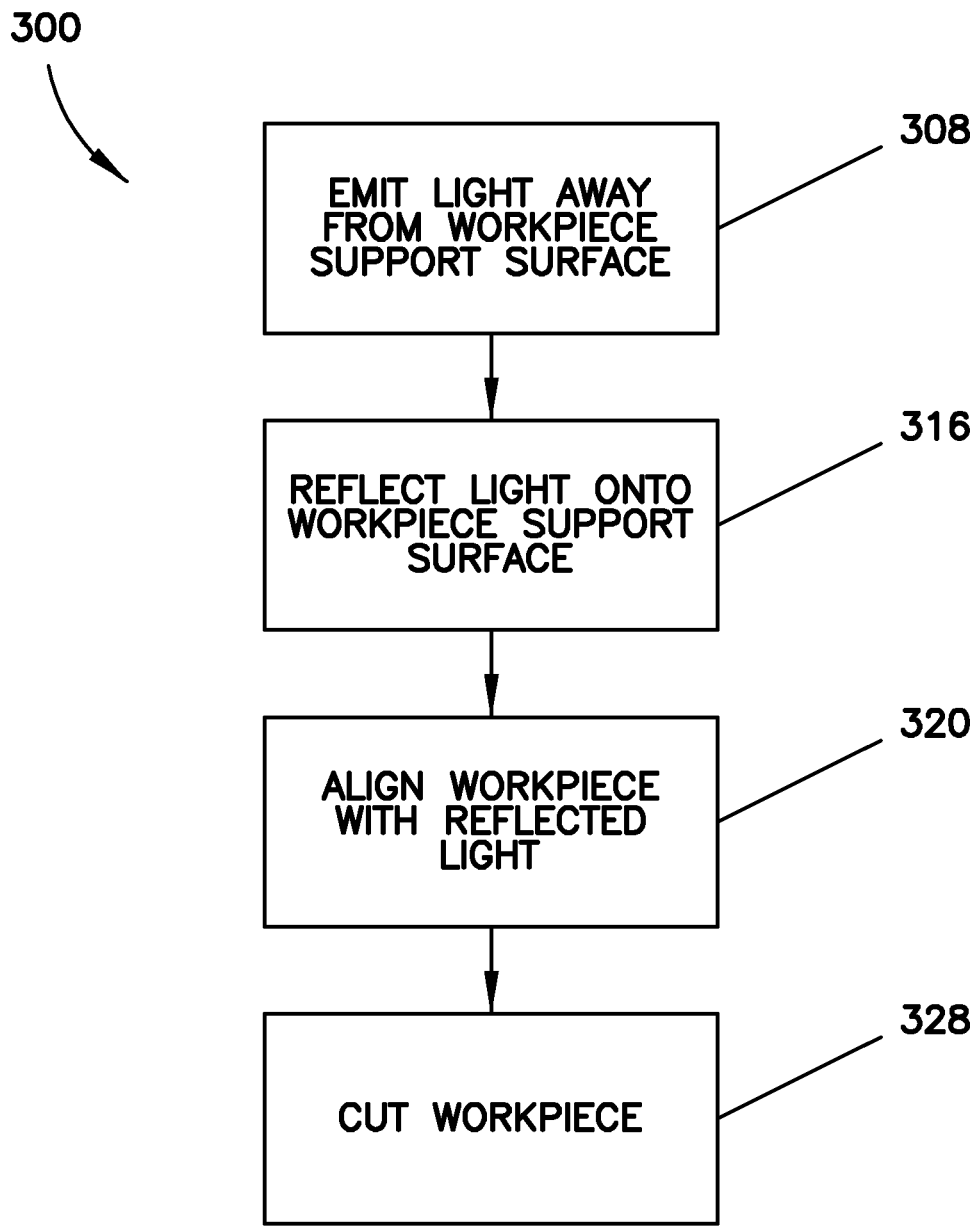
FIG. 3 is a diagram showing a method of operating the table saw of FIG. 1.

In operation, the table saw 100 having the light apparatus 212 and the reflective surface 220 (referred to collectively as the optical alignment device) simplifies the task of aligning a workpiece 156 with the cutting path of the blade 164. The optical alignment device may be used according to the process 300 of FIG. 3. First, the power source 240 supplies the laser diode 244 with electric power, which causes the diode to emit laser light through the lens 248. Next or at the same time, electric power is supplied to the electric motor, which causes the motor shaft 172 to rotate the light apparatus 212 and the blade 164 about the axis of rotation 204. In the block 308, during rotation of the light apparatus 212, the light apparatus emits the laser light 228 through the laser opening 252 and away from the support surface 146.

Next, in the block 316, the reflective surface 220 reflects the laser light onto the workpiece support surface 146. The user of the table saw 100 may rotate/pivot/move the reflective surface 220 about connection point 268 and the axis 292 to position the reflected laser light 276 in a desired location. Typically, the user positions the reflected laser light 276 in alignment with the cutting path of the blade 164. Alternatively, the user may position the reflected laser light 276 to strike a laser line, which is a fixed distance from the cutting path of the blade 164.

In the block 320, after positioning the reflected laser light 276, which appears as a line on the workpiece support surface 146, the user aligns a reference mark on the workpiece 156 with the reflected laser light. Specifically, when the workpiece 156 is placed on the support surface 146, the reflected laser light 276 strikes the workpiece and is visible as a line on the workpiece. The user moves the workpiece 156 to align the reference line with the reflected laser light 276.

Next in the block 328, the user cuts/shapes the workpiece 156 with the rotating blade 164. The workpiece 156 is cut by moving the workpiece toward the blade 164 until the workpiece passes the blade. The reflected laser light 276 strikes the workpiece 156 during the entire cutting operation to increase the accuracy and precision of cuts made with the table saw 100.

The optical alignment device may be offered for sale in combination with the table saw 100. Therefore, the consumer/end user acquires the optical alignment device with the purchase or acquisition of the table saw 100. The optical alignment device purchased with the table saw 100 may be pre-installed by the manufacturer of the table saw 100 or installed by the consumer.

Alternatively, the optical alignment device is purchased by the consumer in the aftermarket, as an accessory for an existing table saw (i.e. the optical alignment device is available for sale without an accompanying table saw). Therefore, the consumer/end user may acquire the light apparatus 212 and the reflective surface 220 for use with an existing table saw. The light apparatus 212 may be used with any existing table saw having a motor shaft that is receivable by the opening 252. The reflective surface 220 may be used with any table saw having a fixed element positioned above the workpiece support surface. The light apparatus 212 emits the laser light from below the support surface through the blade opening if an independent laser opening is not included in the support surface of the table saw. Accordingly, the optical alignment device provides cost savings compared to other optical alignment devices, which are designed for use with only a single table saw.

Figure 4:
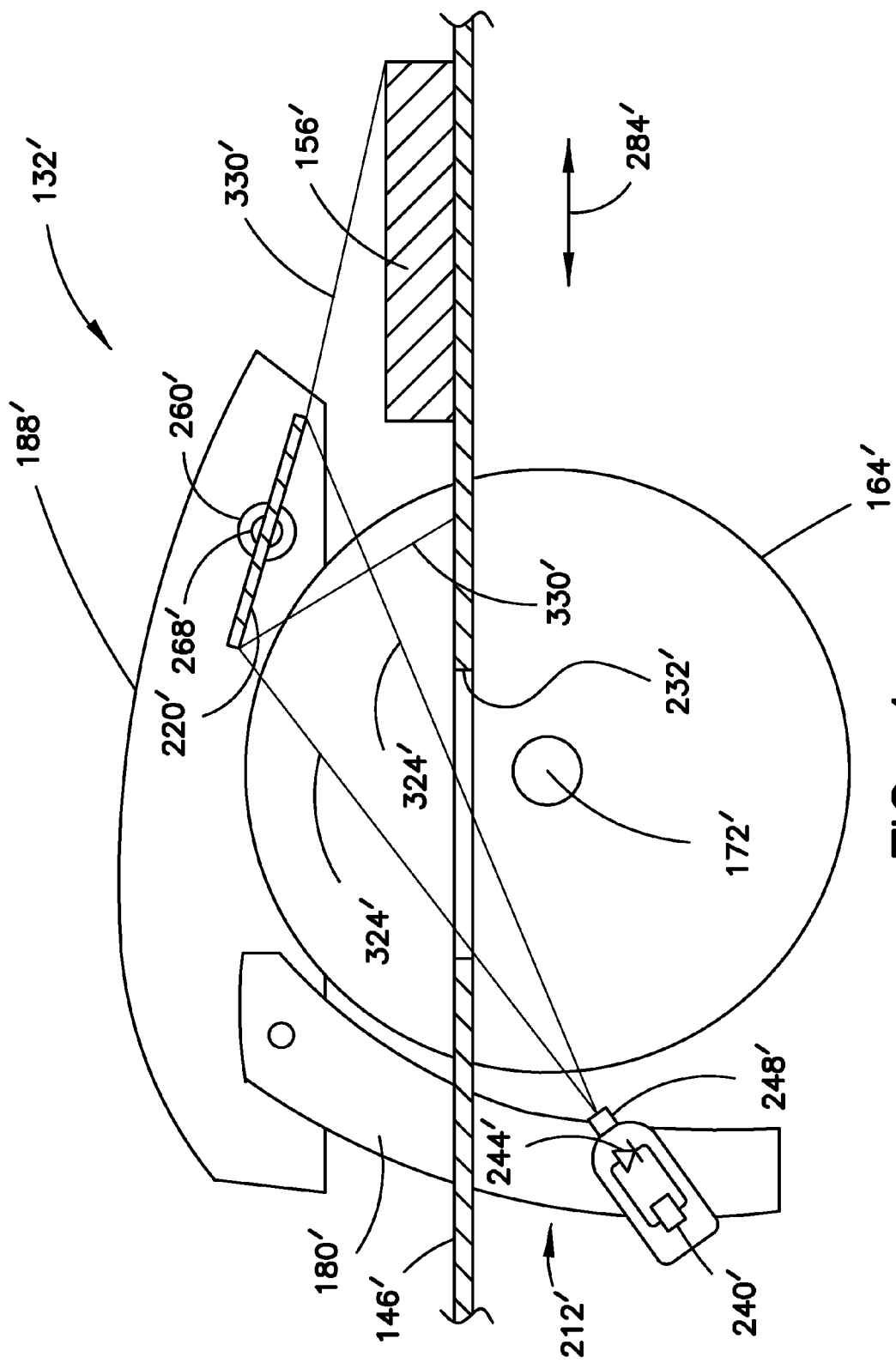
FIG. 4 shows a cross sectional view of the table saw of FIG. 1 along the line II-II, with an alternative embodiment of the light emitting apparatus.

Another embodiment of the optical alignment device for use with the table saw 100 is shown in FIG. 4. For clarity, like components shown in FIG. 4 and FIG. 2 are labeled with like reference numerals except that the reference numerals in the embodiment shown in FIG. 4 include a prime symbol ('). In this embodiment, the reflector apparatus 260' is connected to the blade guard 188', and the light apparatus 212' is connected to the riving knife 180'. Accordingly, the light apparatus 212' is not configured for rotation relative to the motor shaft 172' and the blade 164'. Instead, the light apparatus 212' remains stationary during operation of the electric motor and rotation of the blade 164'. The light apparatus 212' includes a lens 248' that emits a line of laser light 324' away from the support surface 146'. The line of laser light 324' passes through a light opening 232' in the support surface 146'. The light opening 232' and the blade opening 150 are separate and distinct openings in the table top 124. The reflective surface 220' reflects the line of laser light 324' (reflected line of laser light 330') onto the support surface 146' and the workpiece 156'. The laser light 324' may be reflected in a position based on the cutting path of the blade 164'.

The light apparatus 212 of FIG. 2 may be configured for use with the reflector apparatus 260' and the reflective surface 220' shown in the embodiment shown in FIG. 4. Additionally, the light apparatus 212' of FIG. 4 may be configured for use with the reflector apparatus 260 and the reflective surface 220 in the embodiment shown in FIG. 2.

In another embodiment of the table saw 100, the light apparatus 212 and the reflective surface 220 are positioned above the support surface 146. In this embodiment, the light apparatus 220 may be connected to a portion of the riving knife 180 positioned above the support surface 146. Alternatively, the light apparatus 212 may be positioned within the blade guard 188, such that both the light apparatus 212 and the reflective surface 220 are positioned within the blade guard 188.

In yet another embodiment of the table saw 100, the light apparatus 212 is positioned above the support surface 146 and outside of the boundary defined by the table top 124 (i.e. outside of the footprint of the table top 124). In particular, the light apparatus 212 is connected to a support structure (not shown), which is connected to the table top 124 or the enclosure 116 and positions the light apparatus 212 beyond the boundary defined by the table top 124.

With reference again to FIG. 1, it is noted that some embodiments of the table saw 100 do not include the base 108. These embodiments of the table saw 100 may be referred to as portable table saws, jobsite table saws, bench-top tools, and semi-stationary tools. The enclosure 116 of a table saw 100 without a base 108 is configured for placement on a work stand. The light apparatus 212 and the reflective surface 220 are configured for use with any type of table saw.

Although a table saw has been described with respect to certain preferred embodiments, it will be appreciated by those of skill in the art that other implementations and adaptations are possible. Moreover, there are advantages to individual advancements described herein that may be obtained without incorporating other aspects described above. Therefore, the spirit and scope of the appended claims should not be limited to the description of the preferred embodiments contained herein, and the claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants, patentees, and other.

What is claimed is:

1. A table saw comprising:
   a workpiece support surface defining a blade opening through which a cutting blade is configured to extend;
   a rotating laser apparatus positioned below the workpiece support surface and configured to emit a first laser beam; and
   a reflective surface positioned above the workpiece support surface and configured to intermittently reflect the first laser beam toward the workpiece support surface.

2. The table saw of claim 1 wherein the reflective surface is configured to intermittently reflect the first laser beam onto the workpiece support surface at a location indicative of a cutting path of the cutting blade.

3. The table saw of claim 1, further comprising:
   a riving knife having an upper knife portion positioned above the workpiece support surface and a lower knife portion positioned below the workpiece support surface; and
   a blade guard connected to the upper knife portion of the riving knife,
   wherein the reflective surface is connected to one of the upper knife portion and the blade guard.

4. The table saw of claim 1, wherein the rotating laser apparatus emits the first laser beam intermittently through a laser opening in the workpiece support surface.

5. The table saw of claim 1, wherein:
   the cutting blade is configured to rotate about a rotational axis, and
   the laser apparatus is configured to rotate about the rotational axis.

6. The table saw of claim 1, wherein the reflective surface is configured to reflect the first laser beam as the laser apparatus is rotated through an arc.

7. The table saw of claim 6, wherein the laser apparatus is configured to emit a second laser beam spaced apart from the first laser beam.

8. The table saw of claim 7, wherein the reflective surface is configured to intermittently reflect the first laser beam and the second laser beam onto the workpiece support surface to form two parallel line segments of reflected laser beams which identify a cutting width of the cutting blade.

9. A table saw comprising:
   a workpiece support surface defining a blade opening through which a cutting blade is configured to extend;
   a rotating light apparatus positioned below the workpiece support surface and configured to emit a first beam of light; and
   a reflective surface positioned above the workpiece support surface and configured to intermittently reflect the first beam of light onto the workpiece support surface.

10. The table saw of claim 9 wherein the reflective surface reflects the first beam of light intermittently onto the workpiece support surface at a location indicative of a cutting path of the cutting blade.

11. The table saw of claim 9, further comprising:
    a riving knife having an upper knife portion positioned above the workpiece support surface and a lower knife portion positioned below the workpiece support surface; and
    a blade guard connected to the upper knife portion of the riving knife.

12. The table saw of claim 11 wherein:
    the reflective surface is connected to one of the upper knife portion and the blade guard.

13. The table saw of claim 9 wherein:
    the cutting blade is configured to rotate about a rotational axis perpendicular to a direction of the beam of light; and
    the reflective surface is movable about the rotational axis.

14. The table saw of claim 13 wherein:
    the light apparatus is configured to rotate about the rotational axis.

15. The table saw of claim 9, further comprising:
    a motor shaft, wherein the cutting blade defines a first shaft opening through which the motor shaft is configured to extend and the light apparatus defines a second shaft opening through which the motor shaft is configured to extend.

16. The table saw of claim 9, wherein the reflective surface is configured to reflect the first beam of light as the light apparatus is rotated through an arc.

17. The table saw of claim 16, wherein the light apparatus is configured to emit a second beam of light spaced apart from the first beam of light.

18. The table saw of claim 17, wherein the reflective surface is configured to intermittently reflect the first beam of light and the second beam of light onto the workpiece support surface to form two parallel line segments of reflected light beams which identify a cutting width of the cutting blade.

* * * * *